(12) United States Patent
Uratani

(10) Patent No.: US 8,011,638 B2
(45) Date of Patent: Sep. 6, 2011

(54) MARKING DEVICE

(75) Inventor: Hideki Uratani, Nishinomiya (JP)

(73) Assignee: Uratanishoji Kabushiki Kaisha, Nishiyodogawa-ku, Osaka, Osaka (JP)

( * ) Notice: Subject to any disclaimer, the term of this patent is extended or adjusted under 35 U.S.C. 154(b) by 382 days.

(21) Appl. No.: 12/322,761

(22) Filed: Feb. 5, 2009

(65) Prior Publication Data

US 2009/0188399 A1 Jul. 30, 2009

Related U.S. Application Data

(63) Continuation-in-part of application No. 11/211,366, filed on Aug. 24, 2005, now Pat. No. 7,171,894, and a continuation-in-part of application No. 11/644,151, filed on Dec. 22, 2006, now Pat. No. 7,503,542.

(30) Foreign Application Priority Data

Jan. 9, 2009 (JP) ................................ 2009-004014

(51) Int. Cl.
*B29C 33/00* (2006.01)
*B41F 1/07* (2006.01)

(52) U.S. Cl. ..... 249/103; 249/104; 425/182; 425/192 R; 425/193; 425/195; 101/4

(58) Field of Classification Search .................. 249/103, 249/104, 140, 177, 180, 181, 182; 425/182, 425/183, 186, 192 R, 193, 195, 577, 466–468, 425/470; 164/229, 235, 236, 238, 240; 116/309–317; 101/4–7
See application file for complete search history.

(56) References Cited

U.S. PATENT DOCUMENTS

| 4,137,962 A | * | 2/1979 | Pol | 164/236 |
| 4,384,702 A | * | 5/1983 | Boskovic | 249/103 |
| 4,708,314 A | * | 11/1987 | Kuhling | 249/103 |

(Continued)

FOREIGN PATENT DOCUMENTS

DE 3509274 C1 9/1986

(Continued)

OTHER PUBLICATIONS

Translation of FR 2 919 214.*

(Continued)

*Primary Examiner* — Joseph S Del Sole
*Assistant Examiner* — Dimple Bodawala
(74) *Attorney, Agent, or Firm* — Curtis L. Harrington; Harrington & Harrington

(57) ABSTRACT

A marking device comprises an outer shell in a cylindrical shape with a bottom surface attached to a molding device, a rotatable tube provided inside of the outer shell, an indicator connecting to the bottom of the outer shell and a support mechanism pushing up the rotatable tube from the internal space of the outer shell while the indicator and the outer shell are engaged with each other. The head of the indicator is formed in a frusto-conical shape tapered into the inside of the outer shell. The rotatable tube comprises an inner surface contacting to the outer surface of the head of the indicator, and an outer surface forming a frusto-conical head tapered into the inside of the outer shell from a second carved marks. The outer shell comprises an inner surface contacting to the outer surface of the head of the rotatable tube.

13 Claims, 17 Drawing Sheets

U.S. PATENT DOCUMENTS

| | | | |
|---|---|---|---|
| 5,620,716 A * | 4/1997 | Opitz | 425/169 |
| 5,788,872 A | 8/1998 | Uratani | |
| 5,853,606 A * | 12/1998 | Boskovic | 249/103 |
| 5,902,512 A * | 5/1999 | Streit | 249/103 |
| 6,308,929 B1 | 10/2001 | Wieder | |
| 6,354,560 B1 * | 3/2002 | Kawasaki et al. | 249/103 |
| 6,722,273 B1 | 4/2004 | Pruna | |
| 6,755,386 B2 | 6/2004 | Pruna | |
| 6,889,954 B2 | 5/2005 | Pruna | |
| 6,966,257 B2 | 11/2005 | Uratani | |
| 7,171,894 B2 * | 2/2007 | Uratani | 101/4 |
| 7,252,136 B2 * | 8/2007 | Rieke | 164/229 |
| 7,503,542 B2 * | 3/2009 | Uratani | 249/103 |
| 2002/0023998 A1 * | 2/2002 | Picco et al. | 249/103 |
| 2005/0199142 A1 | 9/2005 | Uratani | |
| 2006/0272519 A1 | 12/2006 | Uratani | |

FOREIGN PATENT DOCUMENTS

| | | |
|---|---|---|
| DE | 19928044 | 7/2000 |
| WO | WO 8902831 A1 * | 4/1989 |

OTHER PUBLICATIONS

Japanese Laid-Open patent publication No. 2006-335010 of Dec. 12, 2006.

Japanese Laid-Open patent publication No. 2005-354645 of Sep. 22, 2005.

Japanese Laid-Open patent publication No. Sho54-182653 of Jun. 15, 1978.

French Patent Publication No. 2,919,214 A1 of Jan. 3, 2009.

Tokugan 2002-127145 "Insert Structure for Mold" May 2002

JPS61-44810 "A Mold for Molding Plastic" Jun. 1978.

JP2008-068506 "Marking Device" Pub Mar. 27, 2008.

* cited by examiner

[Fig.1]
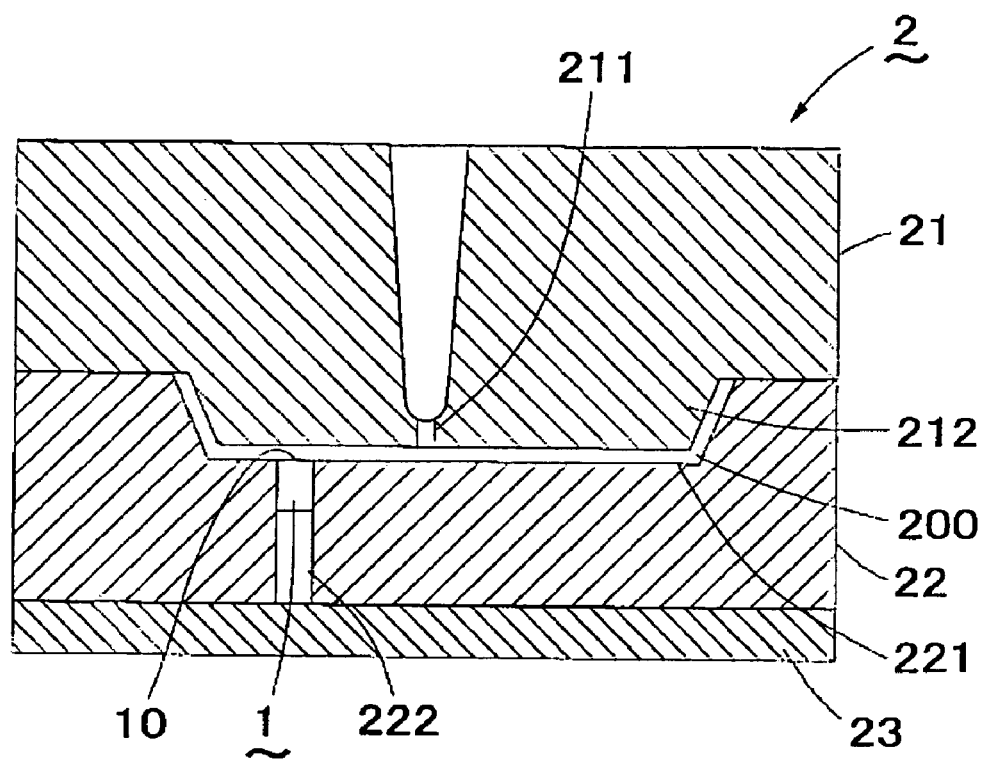

[Fig.2]
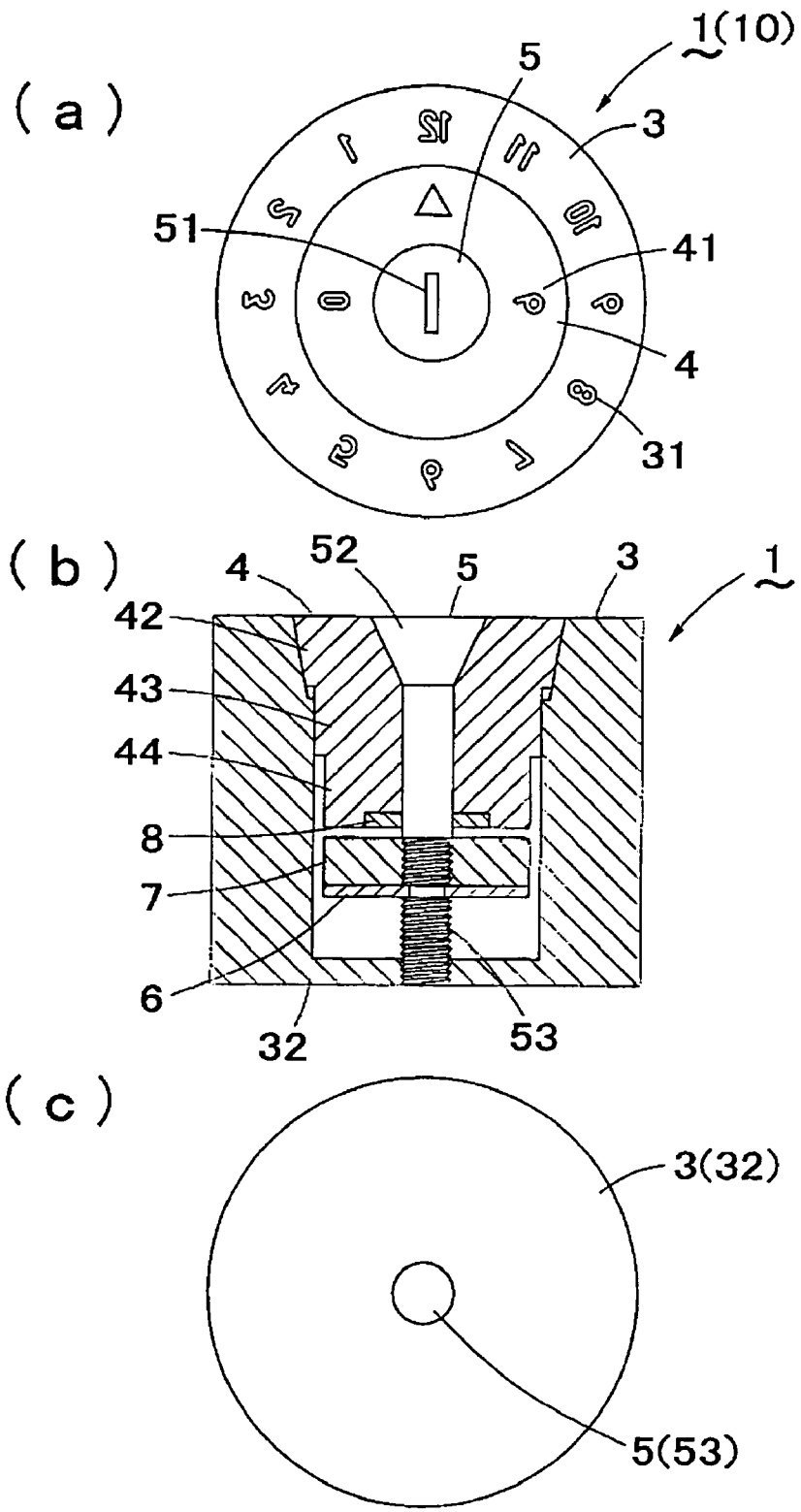

[Fig.3]
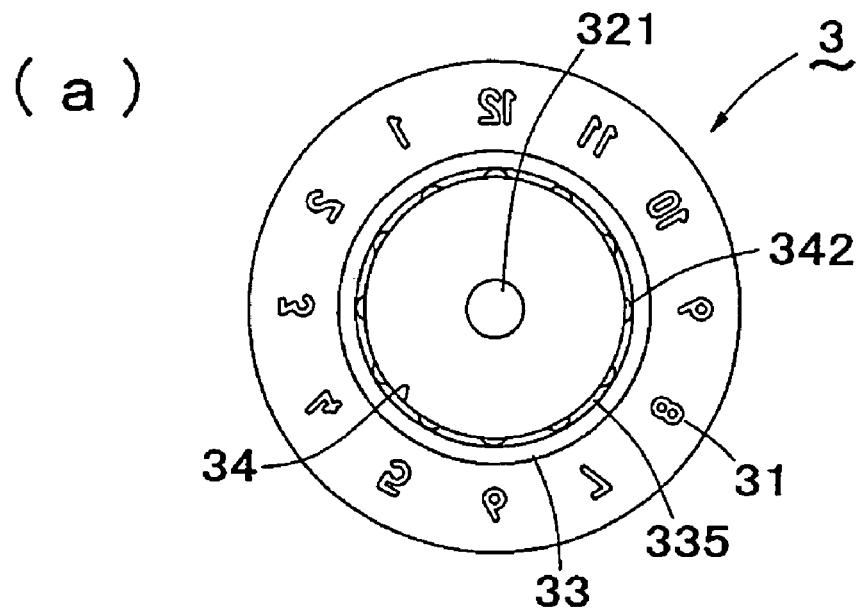
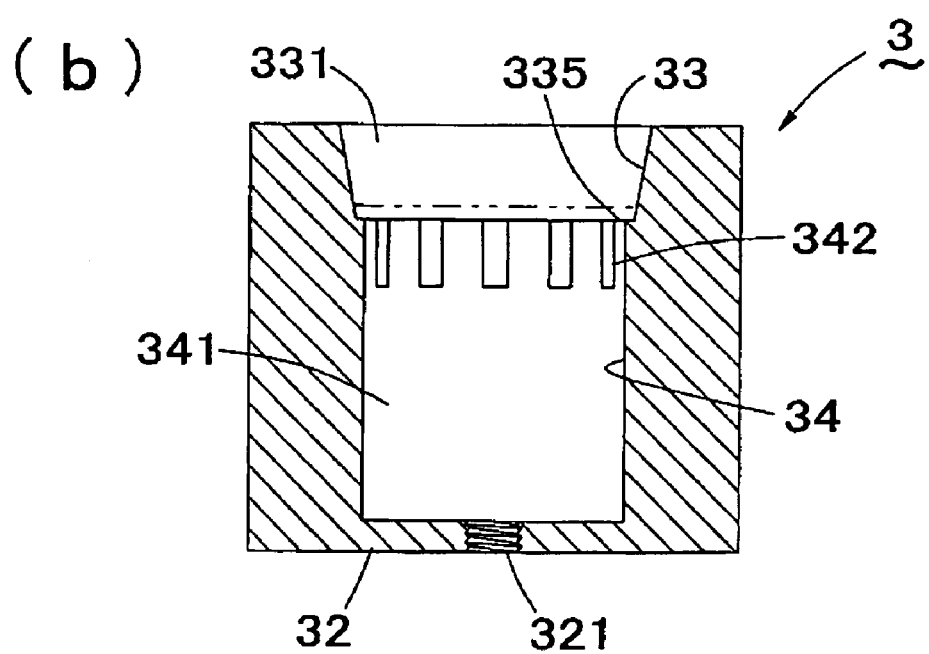

[Fig.4]
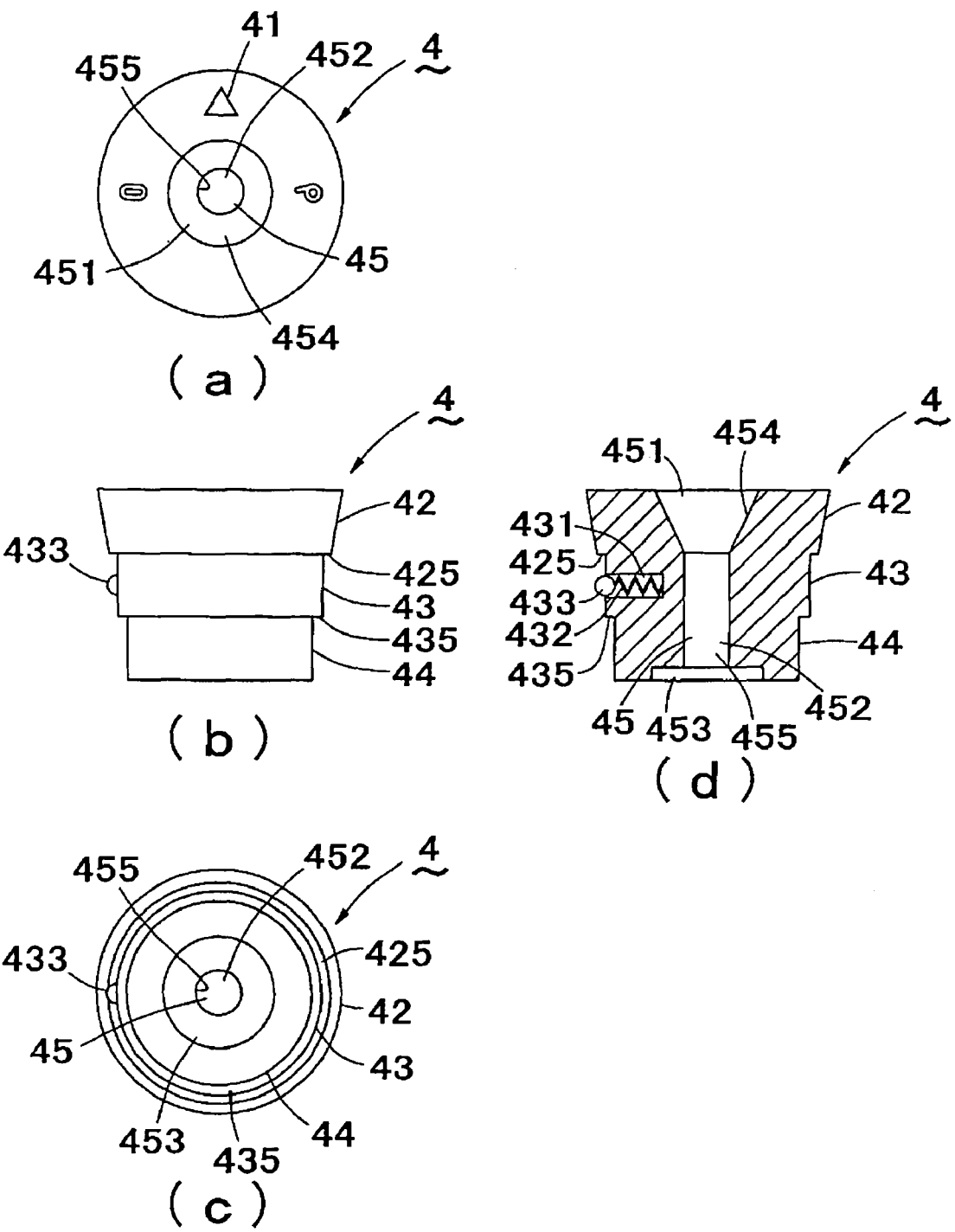

[Fig.5]
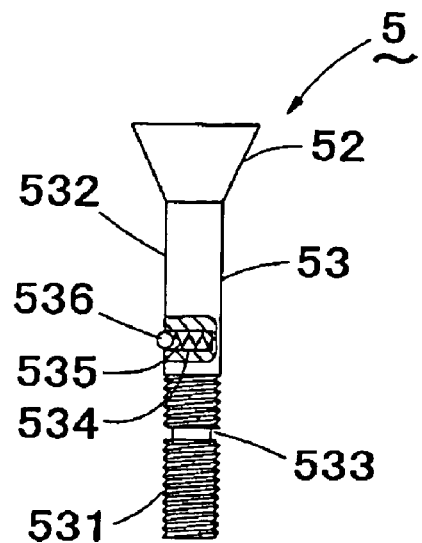
[Fig.6]
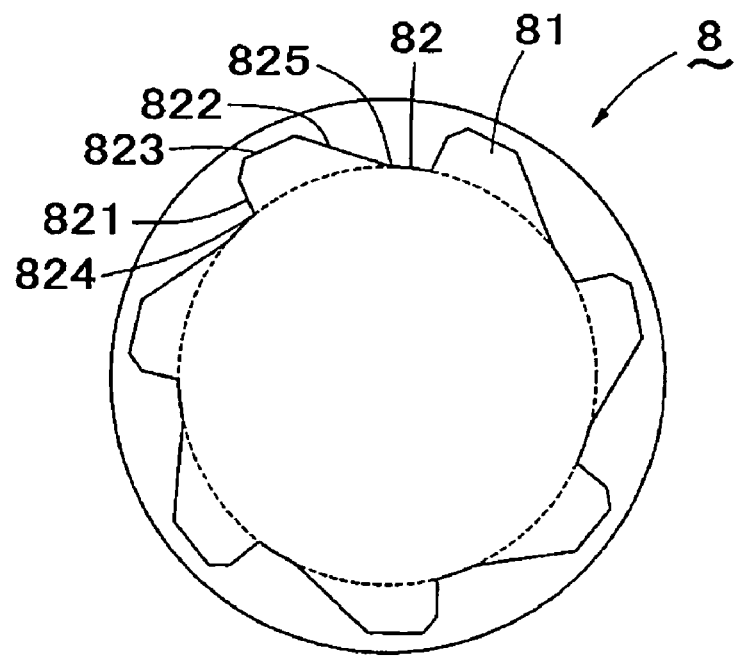

[Fig.7]
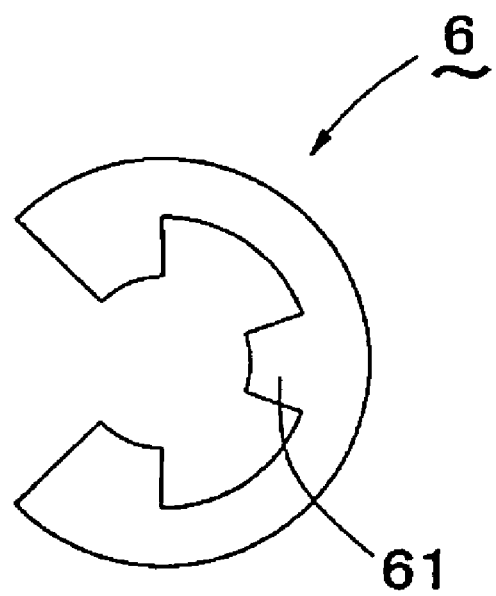

[Fig.8]
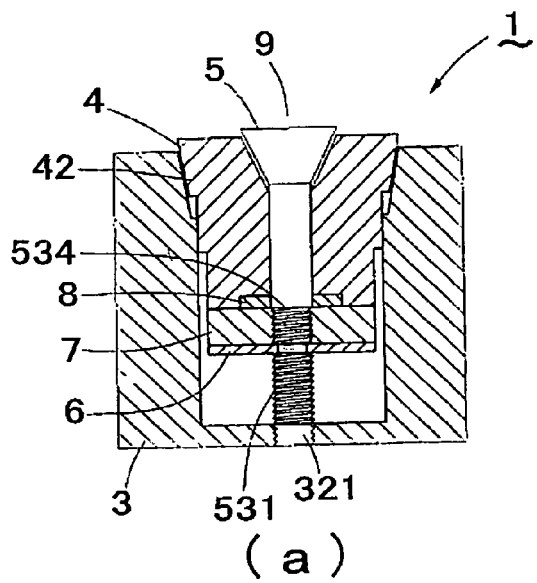
(a)
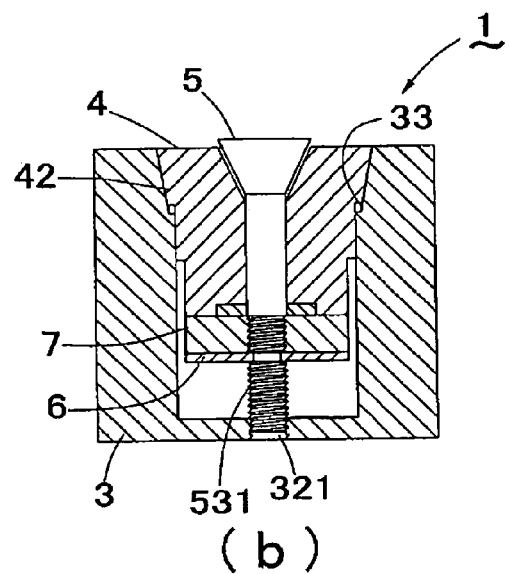
(b)
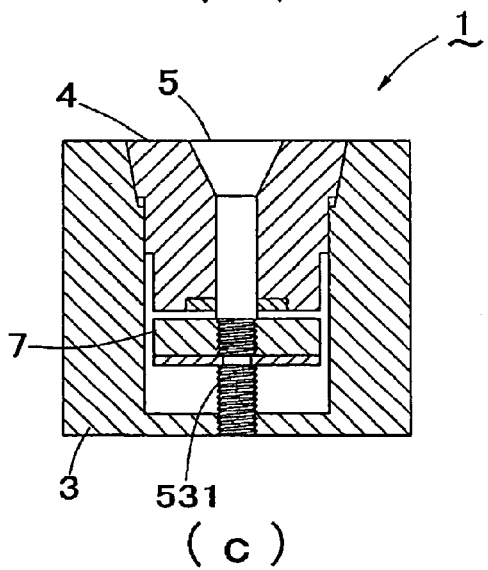
(c)

[Fig.9]
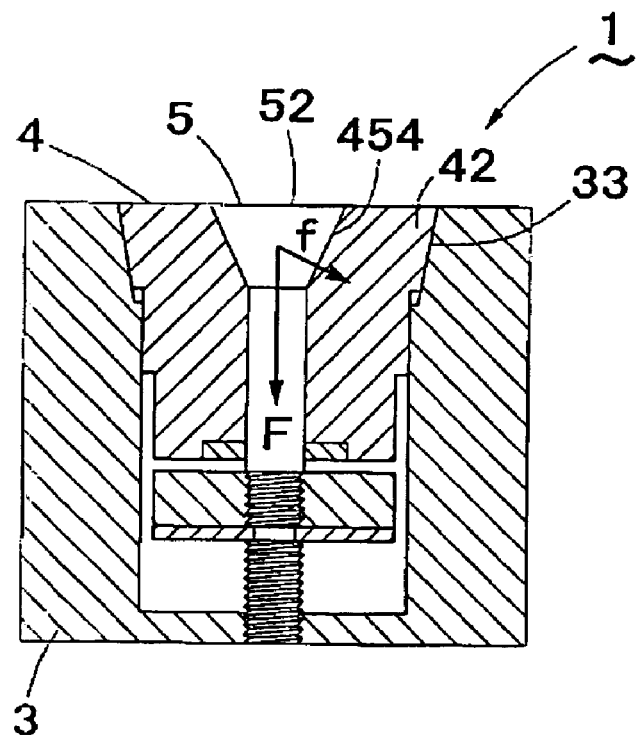
[Fig.10]
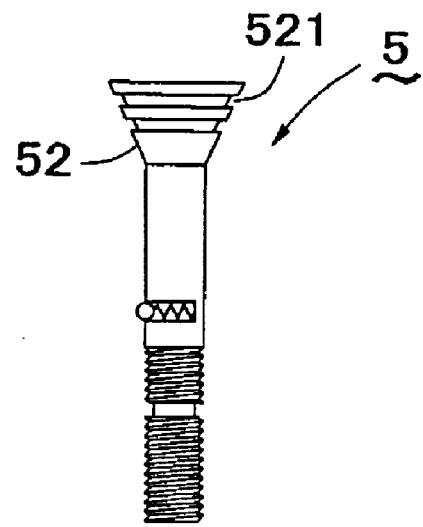

[Fig.11]
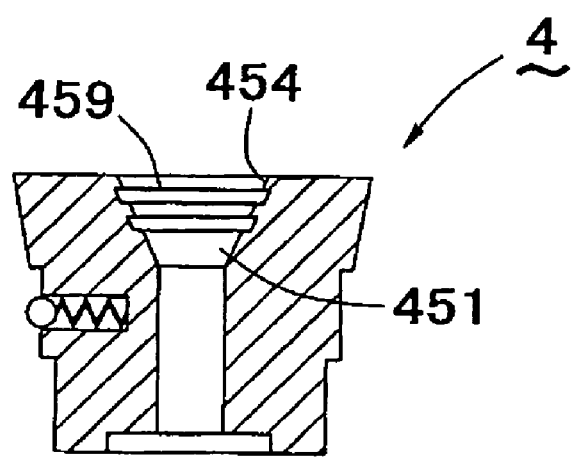
(a)
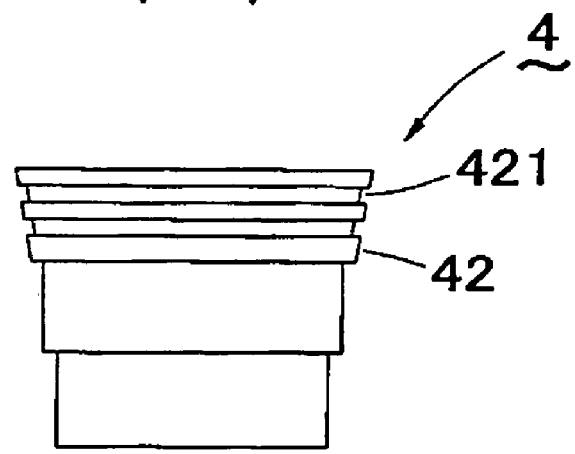
(b)

[Fig.12]
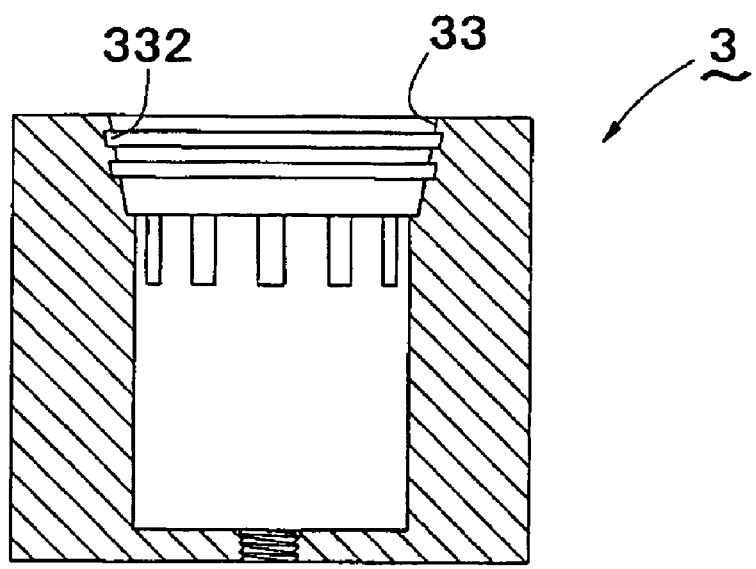

[Fig.13]
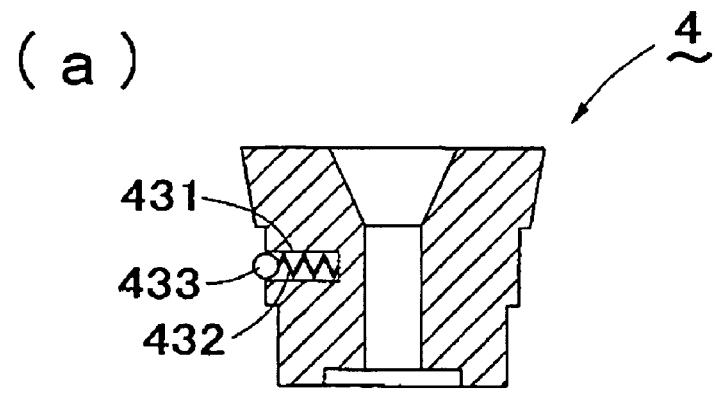
(a)
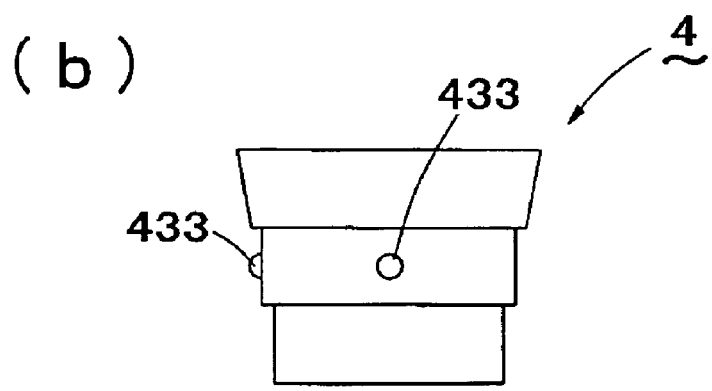
(b)
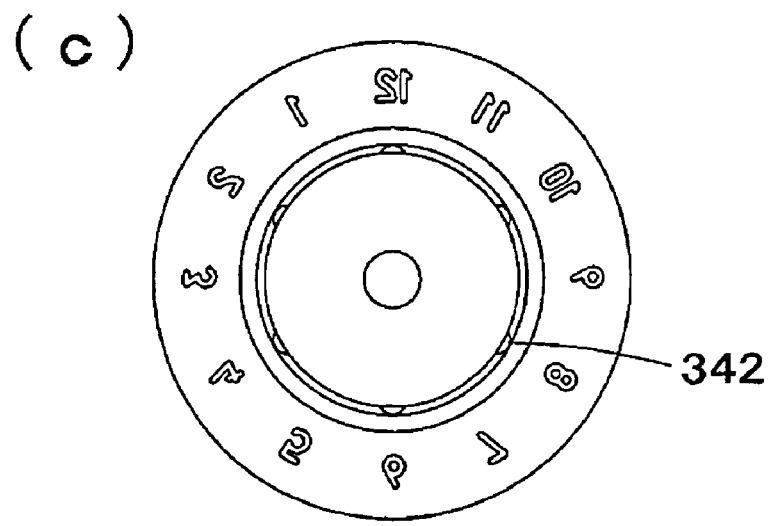
(c)

[Fig.14]
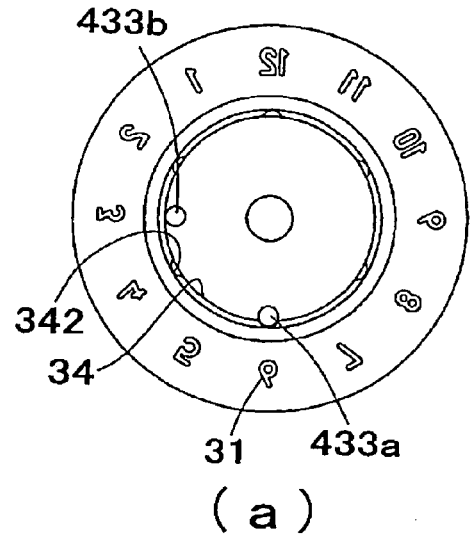
(a)
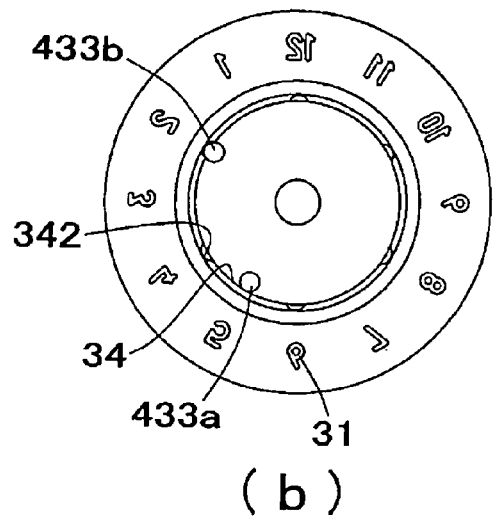
(b)
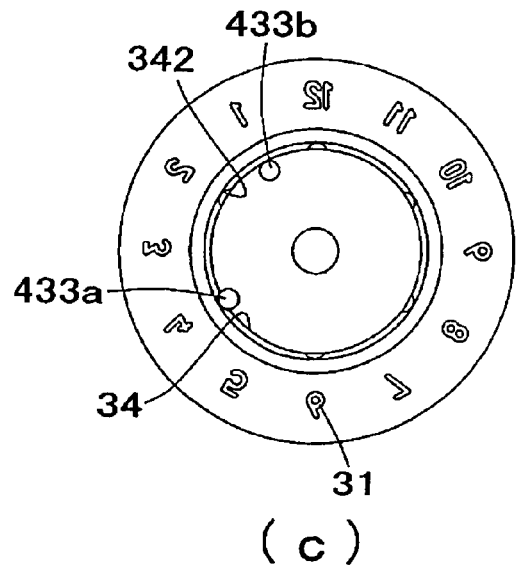
(c)

[Fig.15]
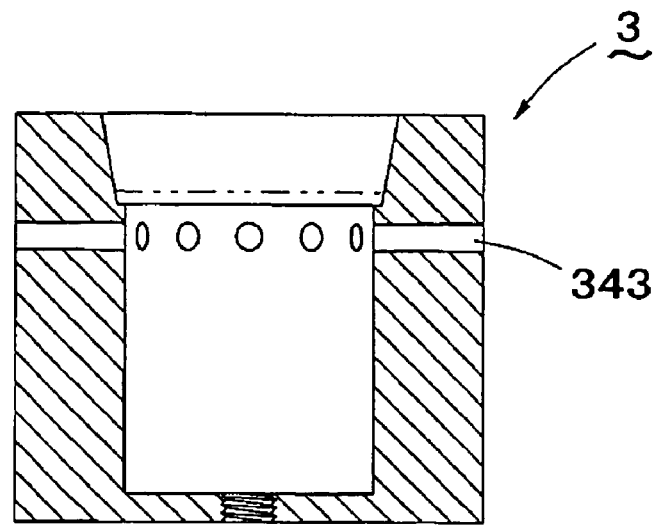
[Fig.16]
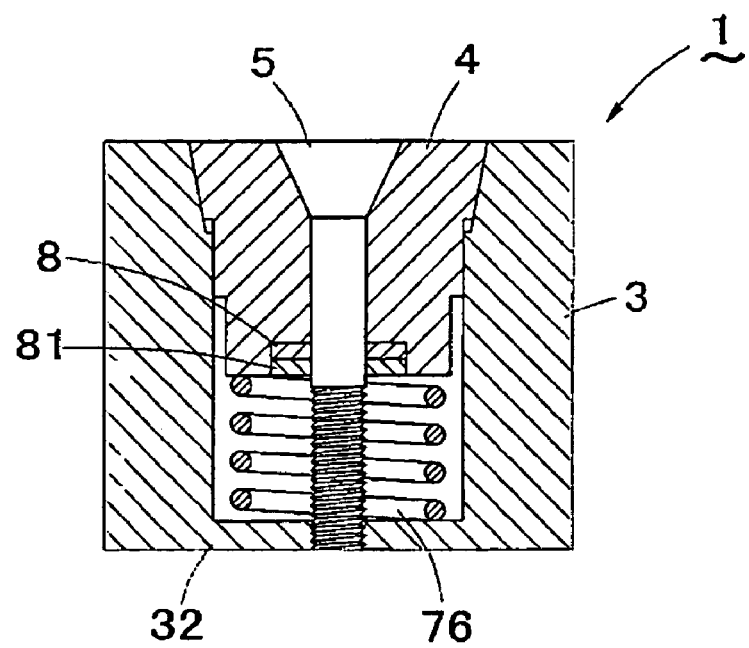

[Fig.17]
(a)
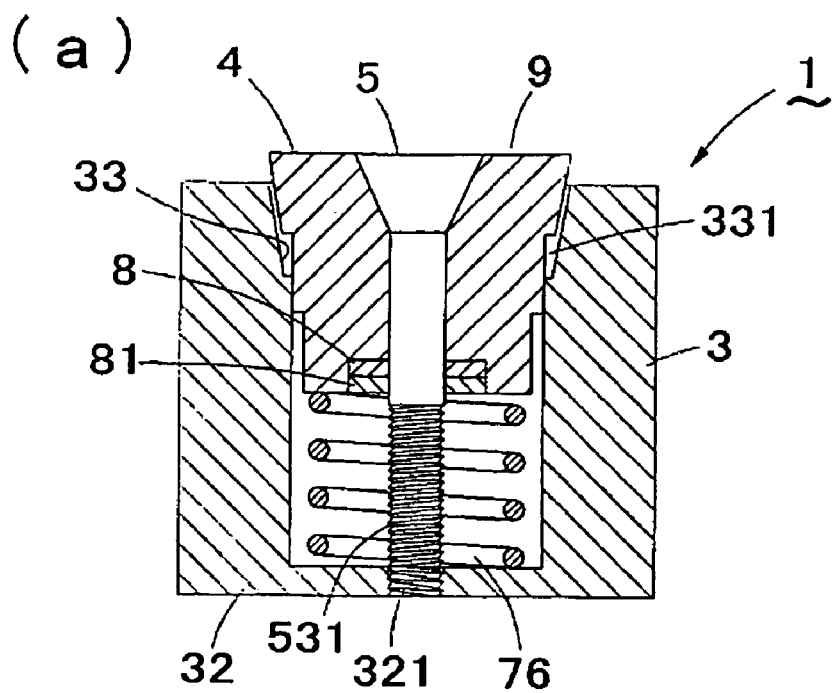
(b)
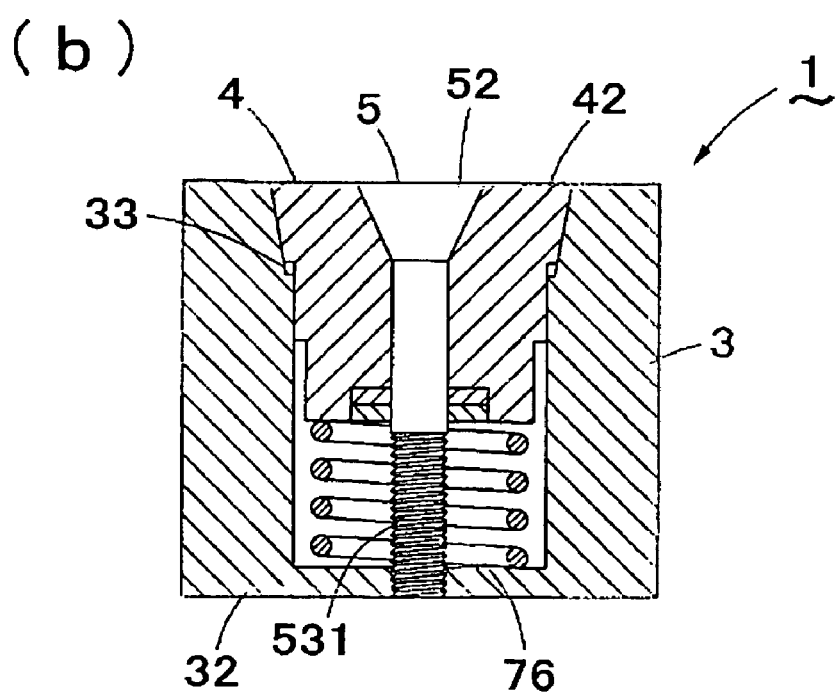

[Fig.18]
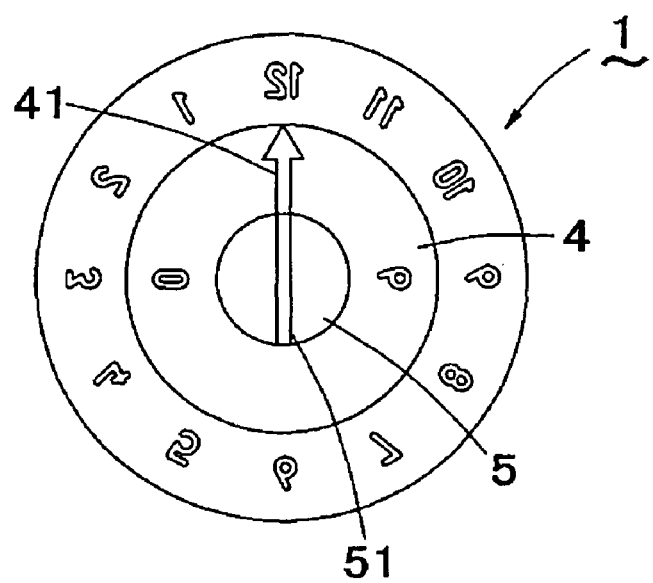
(a)
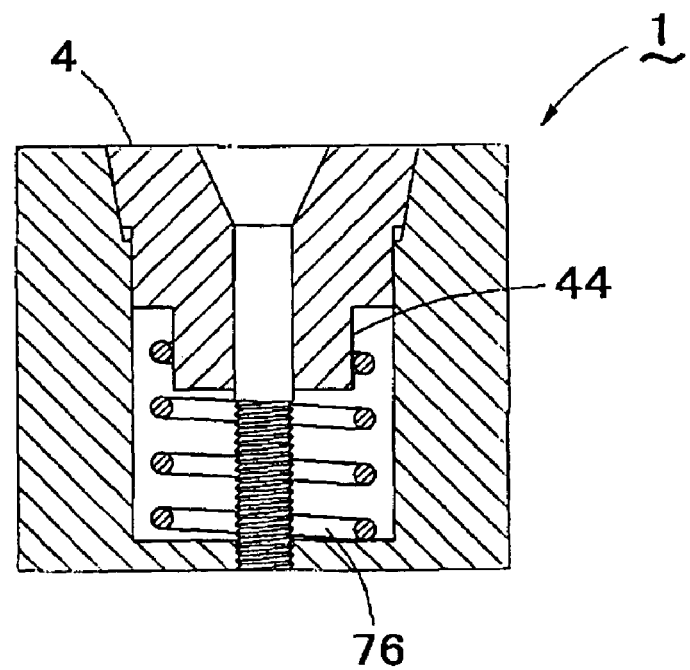
(b)

[Fig.19]
(Prior Art)
(a)
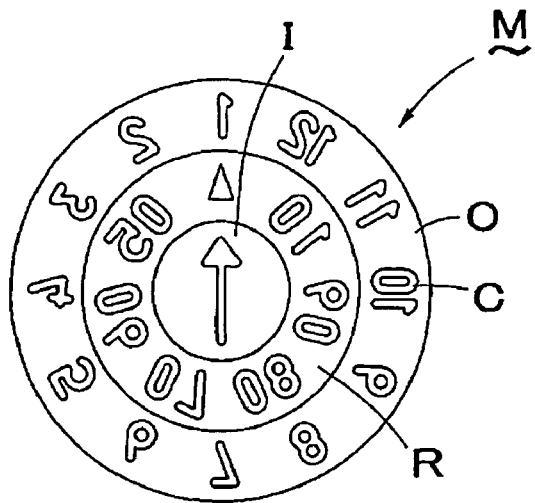
(b)
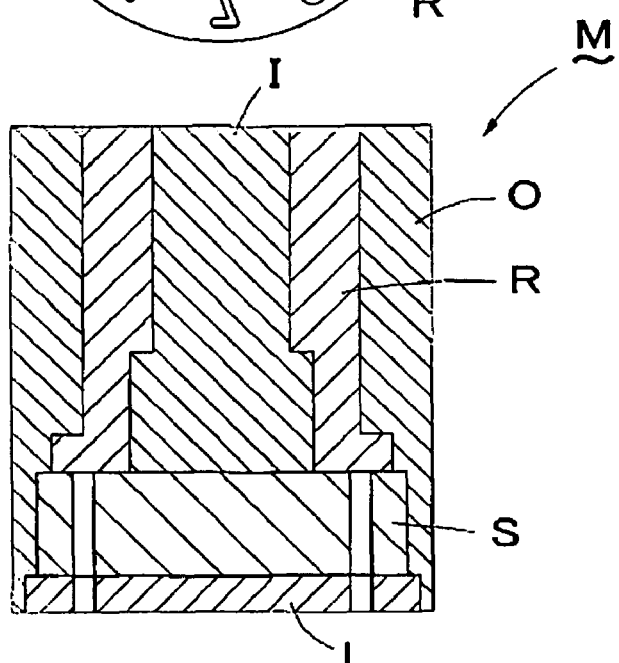
(c)
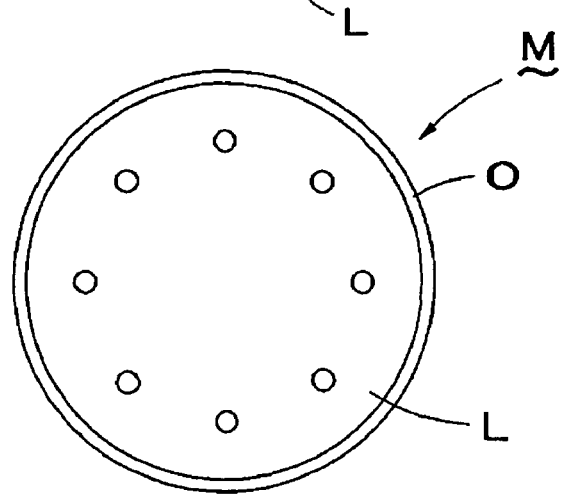

[Fig.20]
(Prior Art)
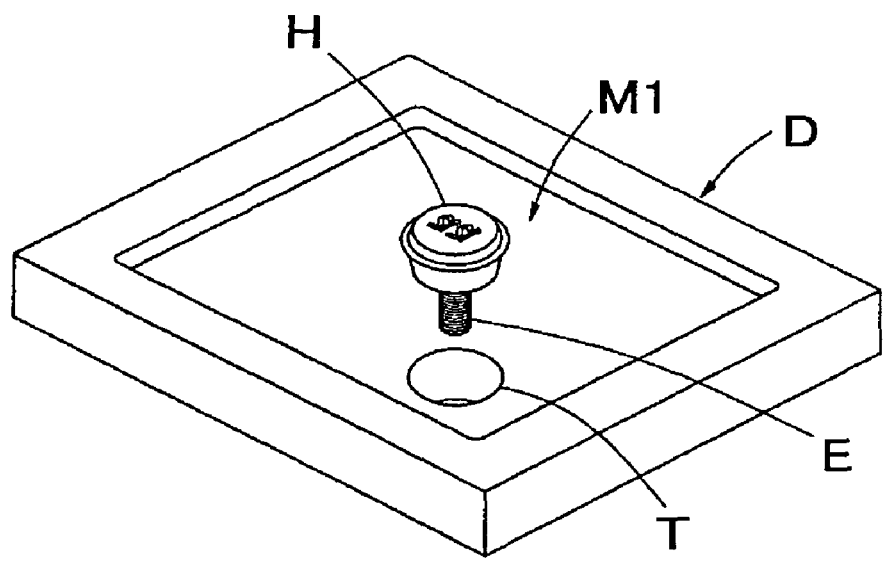

MARKING DEVICE

CROSS REFERENCE TO RELATED APPLICATION

This is a continuation-in-part of U.S. patent application Ser. No. 11/211,366 (filed on Aug. 24, 2005: U.S. Pat. No. 7,171,894) and U.S. patent application Ser. No. 11/644,151 (filed on Dec. 22, 2006 now U.S. Pat. No. 7,503,542).

This application is based upon and claims the benefit of priority from the prior Japanese Patent Application No. 2009-4014 (filed on Jan. 9, 2009), the entire content of which is incorporated herein by reference.

BACKGROUND OF THE INVENTION

1. Field of the Invention

This invention relates to a marking device used in marking the surfaces of products during molding process, more specifically, it relates to a marking device having a high operability as well as capability of preventing molten material penetration during high-temperature molding process.

2. Description of the Background Art

Today, various kinds of resin materials or metallic materials are used for molding process thanks to the development of technologies for molding as well as resin development. Those materials sometimes have a relatively high melting point and require a high temperature for a molding process such as aluminum die cast molding.

Many molding factories manufacturing put an identification label such as manufacturing date or manufacturing line number on their products. Japanese Patent Publication No. 2008-68506 discloses various kinds of marking devices for labeling such identification information. One of the various marking devices is shown in FIG. 19 disclosed in Japanese Patent Publication No. 2008-68506. FIG. 19(*a*) is a plain view of the marking device and FIG. 19(*b*) is a cross sectional view of the marking device. FIG. 19(*c*) is a bottom view of the marking device.

The marking device (M) in FIG. 19 comprises an outer shell (O) in a cylindrical shape, a rotatable tube (R) in a cylindrical shape received in the outer shell (O), an indicator (I) inserted in the rotatable tube (R), a seat member (S) supporting the rotatable tube (R) and indicator (I) within the outer shell (O), and a lid (L) closing a bottom surface of the outer shell (O).

The marking device (M) is fixed to an attachment hole of a molding device. Upper surfaces of the outer shell (o), the rotatable tube (R) and the indicator (I) appears in a cavity of the molding device. Each of the top surfaces of the outer shell (O), rotatable tube (R) and indicator (I) has carved marks (C). When the molten material injected into the cavity flows into the carved marks, identification relief on a surface of the mold product appears after solidification of the molten material. In general, the top surfaces of the outer shell (O), rotatable tube (R) and indicator (I) are leveled with each other to form a flat top surface of the marking device (M) so that their borders do not create annular lines or steps on the mold product.

A marking device (M) disclosed in Japanese Patent Publication No. 2008-68506 internally includes a control mechanism which allows to select a motion of the rotatable tube (R), rotation or stationariness, depending on a rotation direction of the indicator (I). For example, when the indicator (I) is rotated in a clockwise direction, the rotatable tube (R) remains still, on the other hand, when the indicator (I) is rotated in an opposite direction, then the rotatable tube (R) rotates in the same direction as the indicator (I) rotates. Thus, the marking device (M) disclosed in Japanese Patent Publication No. 2008-68506 has a high operability, however, it will be lost when used in a high-temperature molding process such as aluminum die cast molding.

Generally, a kinetic viscosity of a fluid decreases according to an increase in temperature. This means that a molten material with a low kinetic viscosity may enter into a small gap. For example, when the marking device (M) disclosed in Japanese Patent Publication No. 2008-68506 is used for aluminium diecast molding, a molten aluminium with a low kinetic viscosity flows into the border between the outer shell (O) and the rotatable tube (R), and between the indicator (I) and the rotatable tube (R). The flowing molten aluminium is subjected to a cooling process for solidification after a molten aluminium injection process. The solidified aluminium between the outer shell (O) and the rotatable tube (R), and between the indicator (I) and the rotatable tube (R) may prevent the rotation of the indicator (I) and rotatable tube (R).

Japanese Utility Model Publication S61-44810 discloses a marking device (M1) with an effective structure preventing the flow of the molten material. FIG. 20 is a schematic perspective view of Japanese Utility Model Publication S61-44810.

The marking device (M1) disclosed in Japanese Utility Model Publication S61-44810 comprises head (H) in a frusto-conical shape and a leg (E) protruding downwardly from the bottom of the head (H), and the marking device is inserted into a tapered hole (T) formed on a molding device (D). The marking device (M1) is fixed to the molding device (D) by engaging with nut provided with the bottom surface of the molding device (D) and a threaded portion of the leg (E).

A periphery surface of the head (H) contacts to that of the tapered hole (T). Engagement between the nut and the leg (E) causes a high pressure therebetween. Thus, it is possible to prevent a penetration of the molten material into a border between the head (H) and tapered hole (T).

SUMMARY

To achieve the high operability with preventing the penetration of the molten material during the high-temperature molding process, tapered structure used for the marking device disclosed in Japanese Utility Model publication S61-44810 may be applied to the marking device (M) disclosed in Japanese Patent Publication No. 2008-68506. In this case, the tapered structure disclosed in Japanese Utility Model publication S61-44810 may be employed for an upper portion of the inner surface of the outer shell (O), the upper portion of inner and outer surfaces of the rotatable tube (R) and the upper portion of outer surface of the indicator (I) respectively.

When the tapered structure is employed, as described above, there would be a high pressure on the border between the outer shell (O) and the rotatable tube (R) and between the rotatable tube (R) and the indicator (I). This pressure provides a high friction between the tapered surfaces formed on each of the outer shell (O), the rotatable tube (R) and the indicator (I). The high friction between the tapered surfaces restricts the rotational movement of the indicator (I) and the rotatable tube (R).

The marking device (M) in FIG. 19 has the carved mark (C) in an arrow shape formed on the surface of the indicator (I). A tip of a screwdriver inserted in the carved arrow (C) is rotated to rotate the indicator (I).

A deeper carved arrow (C) may be required to provide a higher torque from the screw driver in order to overcome the high friction between the tapered surfaces, but such deeper mark (C) may result in an arrow relief highly protruded from a surface of the molded product or cause a defective demolding process.

Considering the problems described above, one object of the present invention is to provide a marking device having a high operability as well as capability of preventing molten material penetration during a high-temperature molding process.

The present invention relates to a marking device comprising an outer shell, a rotatable tube and an indicator. The outer shell has an upper surface with an opening and a bottom surface with a threaded hole. The rotatable tube having a cylindrical shape is inserted into the outer shell. The indicator is inserted into the rotatable tube and engages with the threaded hole of the outer shell. When the rotatable tube and the indicator are placed into the outer shell, the upper surfaces of the rotatable tube and the indicator are leveled with that of the outer shell. The surfaces of the outer shell, rotatable tube and the indicator become a part of a wall of a cavity of the molding device to which the marking device is attached. Each of surfaces of the outer shell, the rotatable tube and the indicator includes at least one carved mark. A molten material injected into the cavity of the molding device flows into the carved mark on the upper surface of the outer shell, the rotatable tube and the indicator, and thus the product having a relief on its surface can be obtained.

The rotational tube comprises a frusto-conical head which is tapered downwardly and a trunk extending downwardly from the head. An inner room of the outer shell has a shape complementary with the rotatable tube. When the rotatable tube is attached to the outer shell, a whole periphery surface of the tapered head contacts to the inner surface of the outer shell.

The indicator comprises a frusto-conical head which is tapered downwardly and a leg extending downwardly from the head. The leg is provided with a threaded portion which engages with the threaded hole of the outer shell. The inner space of the rotatable tube has a shape complementary with the indicator. When the rotatable tube is inserted into the rotatable tube and engaged with the outer shell, the periphery surface of the tapered head of the indicator contacts to the inner surface of the outer shell.

Tight engagement between the indicator and the outer shell slightly and elastically deforms the indicator. This elastic deformation causes a high stress inside the indicator to be transmitted to the rotational tube and outer shell, which leads to higher pressures at their borders. The high pressures shut out the molten material flow, which is injected into a cavity of molding device, at the upper surface of the marking device.

The marking device according to the present invention comprises a support mechanism configured to support the rotatable tube. In one embodiment, the support mechanism is a nut engaging with the threaded portion of the indicator. The nut is provided with a proximal end of the threaded portion of the indicator. Preferably, the nut is used with a washer contacting with the bottom surface thereof. When an assembly comprising the rotatable tube and the indicator is inserted into the outer shell, the rotatable tube moves downwardly along with the indicator by gravity, and the head of the indicator is offset with the upper surface of the rotatable tube. A nut attached to the indicator stops the rotatable tube moving downwardly and supports at a predetermined position so that the head of the rotatable tube is offset with the upper surface of the outer shell.

As the indicator is rotated for deeper engagement between the threaded portion of the indicator and the threaded hole of the outer shell, the nut moves downwardly and the head of the rotatable tube gradually approaches the inner wall of the outer shell. When the rotatable tube receives the whole head of the indicator, the nut will be apart from the bottom surface of the rotatable tube. When the nut is apart from the bottom surface of the rotatable tube, the upper surfaces of the indicator, rotatable tube and the outer shell are all coplanar. Therefore, there would be no friction between the indicator and the rotatable tube, and between the rotatable tube and the outer shell until the upper surfaces of the indicator, the rotatable tube and the outer surface are leveled with each other. Thus, this configuration minimizes a required torque to be applied to the indicator rotated to assemble the marking device. Further, this configuration comprising a rigid support mechanism (nut) stands relatively higher temperature condition for a longer period than an elastic support mechanism (spring) described below.

In another embodiment, the support mechanism is a coil spring provided between the bottom of the outer shell and a bottom surface of the rotatable tube. The coil spring elastically pushes up the rotatable tube to prevent the friction between the rotatable tube and the outer shell.

The marking device according to the present invention further comprises a ratchet ring fixed to the bottom of the rotatable tube and a control ball protruding from a peripheral surface of the indicator so that the control ball engages with the ratchet ring. A receiving hole is formed with the peripheral surface of the indicator. The control ball connects to one end of the coil spring provided in the receiving hole so that the control ball can be in and out relative to the indicator. The inner edge of the ratchet ring forms at least one concave portion into which the control ball protruded from the receiving hole goes. The inner edge defining the concave portion includes a first edge and a second edge. The first edge engages with the control ball when the indicator is rotated in a first direction, and the second edge guides the control ball to be pushed into said receiving hole when the indicator is rotated in a second direction. Therefore, the rotatable tube is rotated with the indicator when the indicator is rotated in the first direction. On the other hand, the rotating tube remains still when the indicator is rotated in the second direction.

One embodiment of the present invention, the rotatable tube includes at least one positioning ball, and the inner wall of the outer shell is formed with at least one groove. The positioning ball connects to one end of the coil spring provided in a receiving hole formed with a peripheral outer wall of the rotatable tube so that the positioning ball can be in and out relative to the rotatable tube.

In one embodiment, plural of carved marks are placed at a constant pitch on the upper surface of the outer shell. The same number of the corresponding grooves as the carved marks are formed with the outer shell. The rotatable tube also includes one positioning ball. In one embodiment, the number of the groove of the outer shell is a half number of the carved mark, and two positioning balls are provided. One of the two positioning balls engages with one groove, and the other positioning ball retracts into the receiving hole. Therefore, this configuration requires less grooves to obtain sufficient engagement with control ball and so allows downsizing of the marking device.

The present invention includes various embodiments which increases a pressure among the indicator, the rotatable tube and the outer shell.

In another embodiment, the rotatable tube has a greater coefficient of thermal expansion than the rotatable tube.

In another embodiment, the indicator has a greater coefficient of thermal expansion than the rotatable tube.

In another embodiment, a longitudinal length of the head of the rotatable tube is shorter than that of room of the outer shell for receiving the head of the rotatable tube, and the rotatable tube has a greater coefficient of thermal expansion than the outer shell.

In another embodiment, an axel length of the head of the indicator is shorter than that of a room of the rotatable tube for receiving the head of the indicator, and the indicator has a greater coefficient of thermal expansion than the rotatable tube.

In another embodiment, the outer surface of the head of the rotatable tube includes at least one annular groove.

In another embodiment, the inner surface of the outer shell contacting to the outer surface of the head of the rotatable tube includes at least one annular groove.

In another embodiment, the inner surface of the rotatable tube contacting to the outer surface of the head of the indicator includes at least one annular groove.

In another embodiment, the outer surface of the head of the indicator includes at least one annular groove.

BRIEF DESCRIPTION OF THE DRAWINGS

Hereinafter, some embodiments of the marking device of the present invention will be explained with reference to the drawings. An example shown in the drawing is used just for explaining the marking device of the present invention, and the technical scope is not limited to the drawings.

FIG. 1 shows the marking device of the present invention attached to the molding device.

FIG. 2 shows a schematic view of the marking device of the present invention.

FIG. 3 shows an outer shell of the marking device shown in FIG. 2.

FIG. 4 shows a rotatable tube of the marking device shown in FIG. 2.

FIG. 5 shows an indicator of the marking device shown in FIG. 2.

FIG. 6 shows a ratchet ring of the marking device shown in FIG. 2.

FIG. 7 shows a washer of the marking device shown in FIG. 2.

FIG. 8 shows an assembling process of the marking device shown in FIG. 2.

FIG. 9 shows a prevention of molten material penetration into the marking device shown in FIG. 2.

FIG. 10 shows a modified embodiment of the indicator shown in FIG. 5.

FIG. 11 shows a modified embodiment of the rotatable tube shown in FIG. 4.

FIG. 12 shows a modified embodiment of the outer shell shown in FIG. 3.

FIG. 13 shows the rotatable tube and outer shell of the marking device of the present invention used in another embodiment.

FIG. 14 shows a movement of the positioning mechanism of the marking device shown in FIG. 13.

FIG. 15 shows a modified embodiment of the outer shell of the marking device of the present invention.

FIG. 16 shows another embodiment of the marking device of the present invention.

FIG. 17 shows an assembling process of the marking device shown in FIG. 16.

FIG. 18 shows another embodiment of the marking device according to the present invention.

FIG. 19 shows one example of a conventional marking device.

FIG. 20 shows one example of a conventional marking device.

DETAILED DESCRIPTION

FIG. 1 shows the marking device of the present invention attached to the molding device.

The molding device (2) comprises a fixed mold (21), a movable mold (22) approaching or separating from the fixed mold (21), and a movable plate (23) connecting to the movable mold (22) and an actuator (not shown). A force from the actuator is transmitted to the movable mold (22) via the movable plate (23), so that the movable mold (22) can be contact with and apart from the fixed mold (21).

The fixed mold (21) includes an injection outlet (211) from which a molten material such as a molten metal or a molten resin is injected.

The fixed mold (21) also includes a protruding part (212) protruding downwardly around the injection outlet (211). The movable mold (22) includes a concave portion (221), in which the protruding part (212) of the fixed mold (21) moves. A volume of the protruding part (212) is smaller than that of the concave portion (221), and the cavity (200) in a predetermined shape is formed therebetween. In FIG. 1, a bowl-shaped molding having inclined peripheral walls is formed within the cavity (200).

The movable mold (22) is formed with a through hole (222) in communication with the cavity (200) which also vertically penetrates through the movable mold (22). The marking device (1) of the present invention is engaged in the through hole (222) to be fixed to the molding device (2). A surface with at least one carved mark (10) of the marking device (1) is leveled with the surface of the concave portion (221) to face the cavity (200).

FIG. 2 shows a schematic view of the marking device (1). FIG. 2(a) is a place view of the marking device (1), FIG. 2(b) is a longitudinal cross-sectional view of the marking device (1), and FIG. 2(c) is a bottom view of the marking device (1).

The marking device (1) includes an outer shell (3) in a cylindrical shape with a bottom surface, a rotatable tube (4) in a cylindrical shape inserted into the outer shell (3) from an opening formed on an upper surface of the outer shell (3), and an indicator column (5) inserted into the through hole running along a central axis of the rotatable tube (4). The planer top surface of the marking device (1) includes of upper surfaces of the outer shell (3), the rotatable tube (4) and the indicator (5).

The upper surface of the outer shell (3) has carved marks (31) representing numbers from "1" to "12" placed at a constant pitch. In the example shown in FIG. 2, the carved marks (31) on the upper surface of the outer shell (3) indicates "month".

The upper surface of the rotatable tube (4) has carved marks (41) representing number "09" which is disposed on a diameter of the rotatable tube (4) and a triangle symbol. In the example shown in FIG. 2, the carved mark (41) comprising the number "09" indicates "2009" (Christian year). One of vertices of the triangle carved mark (41) also indicates one of the carved marks (31) representing one of the numbers from "1" to "12" on the outer shell (3). Thus, it is possible for the marking device (1) to mark a year and month on the molded product. In the example shown in FIG. 2, the molded product can be marked as "2009 12" (year and month).

A linear carved mark (51) running along a diameter of the indicator (5) is on its upper surface. A tip of a tool such as a slotted screwdriver can be inserted into the carved mark (51). By rotating the tool, the indicator (5) can be rotated.

The indicator (5) comprises a head (52) with a frusto-conical shape which is tapered downwardly, and a leg (53) extending to a bottom (32) of the outer shell (3). A lower end of the leg (53) engages with a threaded hole provided in a center of the bottom (32) of the outer shell (3), so that the indicator (5) connects to the outer shell (3).

The rotatable tube (4) is shorter than the outer shell (3), therefore a space is defined by a bottom surface of the rotatable tube (4) and an upper surface of the bottom (32) of the outer shell (3). In this space, a washer (6) and a nut (7) connected and fixed to the indicator (5) are provided.

The rotatable tube (4) comprises a frusto-conical head (42) which is tapered downwardly, a trunk (43) in a cylindrical shape extending downwardly from the head (42), and a leg (44) extending downwardly from the trunk (43) which is longer in a diameter than the leg (44). The bottom surface of the leg (44) of the rotatable tube (4) is provided with a concave portion in which a ratchet ring (8) is engaged and fixed.

FIG. 3 shows a structure of the outer shell (3). FIG. 3(a) is a plain view of the outer shell (3), and FIG. 3(b) is a longitudinal cross-sectional view of the outer shell (3).

As described above, the cylindrical outer shell (3) includes the bottom (32) with the threaded hole (321) running through a center of the bottom (32) so that the threaded hole (321) engages with a lower end of the indicator leg (53).

Inner space of the outer shell (3) comprises a frusto-conical space (331) defined by an inner wall (33) inclined with respect to an axis of the outer shell (3), and a trunk receiving space (341) surrounded by an inner axis (34) which is parallel to the axis of the outer shell (3).

The frusto-conical space (331) is substantially complementary with and receives the head (42) of the rotatable tube (4). It is preferable that the frusto-conical space (331) may be slightly longer than the head (42) of the rotatable tube (4). A two-dot chain line in FIG. 3(b) shows where a bottom line of the rotatable tube head (42) stays in the marking device assembly (1). When the frusto-conical space (331) receives the whole head (42) of the rotatable tube (4), the upper surfaces of the outer shell (3) and the rotatable tube (4) are leveled with each other, and inner walls (33) of the outer shell (3) forming the frusto-conical space (331) contacts with the periphery surface of the head (42) of the rotatable tube (4).

The trunk receiving space (341) is slightly shorter in diameter than the lowest portion of the frusto-conical space (331). Between the trunk receiving space (341) and the frusto-conical space (331), a shoulder (335) is formed. The inner wall (34) of the outer shell (3) forming the trunk receiving space (341) is formed with 12 concave grooves (342) placed at a constant pitch (30 degrees pitch). The cross section of a concave groove (342) is U-shaped, and the depth of the concave groove (342) is equal to the thickness of the shoulder (335). The concave grooves (342) correspond to the carved marks (31), respectively. Thus, concave grooves (342) are located on a line extending from the center of the outer shell (3) to the carved marks (31), respectively. The concave groove (342) extends downwardly from a border between the trunk receiving space (341) and the frusto-conical space (331). When the frusto-conical space (331) of the outer shell body (3) receives the whole head (42) of the rotatable tube (4), the periphery surface of the trunk (43) of the rotatable tube (4) contacts with the inner wall (34) forming the trunk receiving space (341) of the outer shell body (3).

FIG. 4 shows a structure of the rotatable tube (4). FIG. 4(a) is a plain view of the rotatable tube (4), and FIG. 4(b) is a side view of the rotatable tube (4), FIG. 4(c) is a bottom view of the rotatable tube (4), and FIG. 4(d) is a longitudinal cross-sectional view of the rotatable tube (4).

As described above, the rotatable tube (4) in a cylindrical shape comprises a head (42) with a frusto-conical shape, a trunk (43) in a cylindrical shape extending downwardly from the bottom surface of the head (42), and a leg (44) extending downwardly from the bottom surface of the trunk (43). The trunk (43) is shorter in diameter than the bottom surface of the head (42), so that a shoulder (425) is formed along an outer peripheral border between the trunk (43) and the head (42). The leg (44) is shorter in diameter than the trunk (43), so that a shoulder (435) is formed along an outer peripheral border between the leg (44) and the trunk (43).

The rotatable tube (4) comprises a through hole (45) extending along with its center axis. The through hole (45) can be segmented into a frusto-conical space (451) for receiving the head (52) of the indicator (5), and a space (453) for receiving a ratchet ring (8).

In the example shown, the frusto-conical space (451) is complementary with and receives the head (52) of the indicator (5). It is preferable that the frusto-conical space (451) is longer than the head (52) of the indicator (5). When the frusto-conical space (451) receives the whole head (52) of the indicator (5), the upper surfaces of the rotatable tube (4) and the indicator (5) are leveled with each other, and inner walls (454) of the rotatable tube (4) forming the frusto-conical space (451) contacts with the outer surface of the indicator head (52). The leg receiving space (452) extends downwardly from a lower end of the frusto-conical space (451). It is preferable to define a thin space between the inner wall (455) of the rotatable tube (4) forming the leg receiving space (452) and the peripheral surface of the indicator (5). The bottom surface of the leg (44) of the rotatable tube (4) is formed with a reception (453) adjacent to the leg receiving space (452). A ratchet ring (8) is engaged into the reception (453).

The trunk (43) of the rotatable tube (4) comprises a receiving hole (431) extending to the center axis of the rotatable tube (4). A coil spring (432) is provided in the receiving hole (431) to which the proximal end of the coil spring (432) connects. The tip of the coil spring is attached with a spherical positioning ball and a part of which is protruding from the periphery surface of the trunk (43) of the rotatable tube (4).

A configuration comprising the receiving hole (431), the coil spring (432), and the positioning ball (433) and the coil spring (432) works as a positioning mechanism for the rotatable tube (4). This structure has a positioning property to the rotatable tube (4). When the rotatable tube (4) rotates around its axis, the positioning ball (433) engages with the concave groove (342), then stops the rotatable tube (4) at a predetermined position. As a result, the triangle carved mark (41) on the upper surface of the rotatable tube (4) is easily directed to the carved mark (31) on the upper surface of the outer shell (3).

FIG. 5 shows a side view of the indicator (5), and a part of the indicator (5) in FIG. 5 is shown as a cross sectional view.

As described above, the indicator column (5) comprises a head (52) with a frusto-conical shape, and a leg (53) in a cylindrical shape extending downwardly from the bottom surface of the head (52).

The leg (53) comprises a threaded portion (531) formed in its lower part of the indicator column (5), and a non-threaded portion (532) connecting the threaded portion (531) and the head (52). A neck (533) provided in the middle of the threaded portion (531) is thinner than other portion of the leg (533). The neck (533) is engaged with a washer (6). A nut (7) occupies an interval from the proximal end (534) of the threaded portion (531) to the neck (533). When the frusto-conical space (451) of the rotatable tube (4) receives the whole head (52) of the indicator (5), the proximal end (534) of the threaded portion (531) is located slightly below the bottom surface of the rotatable tube (4). As a result, a thin gap is formed between the upper surface of the nut engaging with the threaded portion (531) and the bottom surface of the rotatable tube (4).

Non-threaded portion (532) comprises a receiving hole (534) extending to the center axis of the indicator (5). A coil spring (535) is provided in the receiving hole (534) to which a proximal end of the coil spring (535) is fixed. A peripheral control ball (536) is attached to the tip of the coil spring (535). A part of the control ball (536) is protruded from the outer surface of the non-threaded portion (532).

FIG. 6 shows a plain view of a ratchet ring.

The ratchet ring (8) comprises an annular thin plate. In FIG. 8, a circle indicated by a dot line shows an outer surface location of the non-threaded portion (532) of the indicator (5). The ratchet ring (8) defines control spaces (81) radially extending toward an outer ring edge. In FIG. 8, 7 control spaces (81) are shown. The control space (81) appears outside the non-threaded portion (532) of the indicator (5) to receive the control ball (536) protruding from the outer surface of the non-threaded portion (532).

The trapezoidal control space (81) is defined by a first edge (821) and a second edge (822) which extend from the inner edge (82) of the ratchet ring (8) contacting with the non-threaded portion (532) of the indicator (5), and a third edge (823) connecting between distal ends of the first an second edges (821) (822). The first edge (821) is steeply inclined relative to a tangential line of the outer surface of the non-threaded portion (532) of the indicator (5) at the proximal end point (824) of the first edge (821). The second edge (822) is gently inclined relatively to a tangential line of the inner surface of the non-threaded portion (532) of the indicator (5) at the proximal end point (825) of the second edge (822).

The ratchet ring (8) is fixedly incorporated in the ring reception (453) of the rotatable tube (4), and moves together with the rotatable tube (4). When the indicator (5) is rotated in an anticlockwise direction, the control ball (536) in the control space (81) is caught by the first edge (821), which leads to an anticlockwise rotation of the rotatable tube (4) with the indicator (5). On the other hand, when the indicator (5) is rotated in a clockwise direction, the control ball (536) is guided along the second edge (822) and goes inside the receiving hole (534) formed in the non-threaded portion (532). The torque from the indicator (5) is not transmitted to the rotatable tube (4), therefore it remains stationary.

FIG. 7 shows a plain view of a washer (6).

The washer (6) is formed with a C-shaped thin plate. The washer (6) in FIG. 7 comprises three tongue pieces (61) protruding to a center axis of the washer (6). The tongue piece (61) engages with a neck (533) formed in the threaded portion (531) of the indicator (5). An upper surface of the washer (6) contacts to the bottom surface of the nut (7) to prevent it from loosening.

FIG. 8 shows an assembly process of the marking device (1)

First, the ratchet ring (8) is engaged with the ring reception (453) of the bottom surface of rotatable tube (4), and then the indicator (5) is inserted into the through hole (45) of the rotatable tube (4). Then, the nut (7) is engaged with the threaded portion (531) of the indicator (5) below the bottom surface of the rotatable tube (4) and reaches the proximal end (534) of the threaded portion (531). Thus, an assembly (an internal assembly (9)) comprising the rotatable tube (4) and the indicator (5) to be placed into the outer shell (3) is now completed.

FIG. 8(a) is a cross sectional view showing that the internal assembly (9) is inserted into the outer shell (3). In FIG. 8(a), the threaded portion (531) of the indicator (5) and the threaded hole (321) in the bottom of the outer shell (3) are not engaged.

In FIG. 8(a), the rotatable tube (4) moves downwardly relative to the indicator (5) by gravity, and the bottom surface of the rotatable tube (4) contacts with the upper surface of the nut (7). The upper surface of the nut (7) gives the rotatable tube (4) an upward reaction force against the gravity so that the rotatable tube is offset with the outer shell (3). Therefore, the outer surface of the head (42) of the rotatable tube (4) is apart from the inner wall (33) defining the frusto-conical space (331) of the outer shell (3). This results in no friction between the inner wall (33) of the frusto-conical space (331) and the inner surface of the head (42) of the rotatable tube (4). The rotatable tube (4) also moves downwardly relative to the indicator (5). This produces a space between the outer surface of the head (52) and the inner wall (454) defining the frusto-conical space (451) of the rotatable tube (4) so that there is no friction therebetween. Therefore, the torque to be required to rotate the indicator (5) goes down.

The FIG. 8(b) shows that the threaded portion (531) of the indicator (5) and the threaded hole (321) of the outer shell (3) is further deeply engaged and the upper surfaces of the rotatable tube (4) and the outer shell (3) are leveled with each other.

As shown in FIG. 8(a), before starting the engagement of the threaded portion (531) of the indicator (5) with the threaded hole (321) of the outer shell (3), the upper surface of the rotatable tube (4) is located above with respect to the upper surface of the outer shell (3). When the threaded portion (531) is further engaged with the threaded hole (321) by rotating the indicator (5), the rotatable tube (4) supported by the nut (7) enter into the inner space of the outer shell (3) with the indicator (5).

In the structure of the ratchet ring (8) shown in FIG. 6, when the indicator (5) is rotated in clockwise direction to continue the engagement of the threaded portion (531) of the indicator (5) with the threaded hole (321) of the outer shell (3), the torque/force from the tool to rotate the indicator (5) is barely transmitted to the rotatable tube (4). Therefore, the washer (6) prevents the nut (7) from loosening although the upper surface of the nut (7) rubs the bottom surface of the rotatable tube (4).

FIG. 8(c) shows that the threaded portion (531) of the indicator (5) is further engaged with the threaded hole (321) of the outer shell (3).

When the upper surface of the rotatable tube (4) is leveled with the upper surface of the outer shell surface (3), the head (42) of the rotatable tube (4) is supported by the inner wall (33) which defines the frusto-conical space (331) of the outer shell (3). Therefore, the rotatable tube (4) does not move downwardly when the indicator (5) is further moved downwardly by further engagement of the threaded portion (531) of the indicator (5) with the threaded hole (321) of the outer shell (3). Thus, when the indicator (5) is further moved downwardly, the upper surface of the nut (7) moves apart from the bottom surface of the rotatable tube (4), so that the indicator (5) is disconnected from the rotatable tube (4). Therefore, the rotation of the indicator (5) requires very small torque until the upper surface of the indicator (5) is leveled with the upper surface of the rotatable tube (4).

After the upper surface of the indicator (5) is leveled with the upper surface of the rotatable tube (4), the indicator (5) is further tightened to complete the marking device (1).

FIG. 9 shows a prevention of molten material penetration.

As described above, when the indicator (5) is further tightened, it is slightly extended to cause an elastic force (F) inside. Due to this elastic force (F), the head (52) of the indicator (5) produces a vertical component force (f) relative to the tapered peripheral surface of the head (52) of the indicator (5). This component force (f) presses the head of the indicator (5) to the inner wall (454) of the rotatable tube (4) so that the molten material penetration into the marking device from the border between the indicator (5) and the rotatable tube (4) can be prevented. The component force (f) also pushes the head of the rotatable tube (4) to the inner wall (33) of the outer shell (3) so that the molten material penetration into the marking device from the border between the rotatable tube (4) and the outer shell (3) can be prevented.

Each of the outer shell (3), the rotatable tube (4) and the indicator (5) may be formed using different materials. For example, forming the indicator (5) using a material having greater coefficient of thermal expansion than the rotatable tube (4) results in much greater pressure between the head (52) of the indicator (5) and the rotatable tube (4). Forming the rotatable tube (4) using a material having greater coefficient of thermal expansion than the rotatable tube (4) results in much greater pressure between the head (42) of rotatable tube (4) and the outer shell (3).

FIG. 10 shows a modified embodiment of the indicator (5).

As shown in FIG. 10, one or more annular groove (521) may be formed along the outer surface of the head (52) of the indicator (5). This results in lesser contact area between the head (52) of the indicator (5) and the inner surface (454) of the rotatable tube (4), therefore, greater pressure on the contact portion can be achieved therebetween.

FIG. 11 shows a modified embodiment of the rotatable tube (4). FIG. 11(a) is a cross-sectional view of the rotatable tube (4) according to the modified example, and FIG. 11(b) is a side view of the rotatable tube (4) according to another modified example.

As shown in FIG. 11(a), one or more annular groove (459) may be formed along the inner wall (454) which defines the frusto-conical space (451) of the rotatable tube (4). This decreases a contact area between the head (52) of the indicator (5) and the inner surface (454) of the rotatable tube (4), therefore, greater pressure on the contact portion therebetween can be achieved.

As shown in FIG. 11(b), one or more annular groove (421) may be formed along the outer surface of the head (42) of the rotatable tube (4). This decreases a contact area between the head (42) of the rotatable tube (4) and the inner surface (33) of the outer shell (3), therefore, greater pressure on the contact portion therebetween can be achieved.

FIG. 12 shows a modified embodiment of the outer shell (3).

As shown in FIG. 12, one or more annular groove (332) may be formed along the inner wall (33) which defines the frusto-conical space (331) of the outer shell (3). This decreases a contact area between the head (42) of the rotatable tube (4) and the inner surface (33) of the outer shell surface (3), therefore, greater pressure on the contact portion therebetween can be achieved.

FIG. 13 shows another modified embodiment of the rotatable tube (4) and the outer shell (3). FIG. 13(a) is a cross-sectional view of the rotatable tube (4), and FIG. 13(b) is a side view of the rotatable tube (4), and FIG. 13(c) is a plain view of the outer shell (3).

When the diameter of the marking device (1) is smaller, a width and depth of a positioning groove (342) for locating the rotation position of the rotatable tube (4) also becomes smaller. This results in too shallow engagement of the positioning groove (342) with the positioning ball (433) to position the rotatable tube (4).

In the example shown in FIG. 13, the rotatable tube (4) comprises a pair of receiving hole (431), a coil spring (432) provided with each receiving hole (431), and a positioning ball (433) attached to the distal end of the coil spring (432). An axis line of the pair of receiving hole (431) crosses on the center line of the rotatable tube (4) at right angle. The pair of receiving hole (431) is also provided on the same horizontal surface.

In the example shown in FIG. 3, the positioning groove (342) corresponds to each carved mark (51) on the upper surface of the outer shell (3). However, the positioning groove (342) of the outer shell (3) shown in FIG. 13 corresponds to even numbers from "1" to "12" carved on the upper surface of the outer shell (3). The number of the positioning grooves (342) in FIG. 13 is half of that in FIG. 3.

FIG. 14 shows the relationship between the positioning ball (433) and the positioning groove (342) when using the rotatable tube (4) and the outer shell (3) shown in FIG. 13. In FIG. 14, numerals (433a) and (433b) indicate one positioning ball and another positioning ball, respectively.

In FIG. 14(a), one positioning ball (433a) engages with the positioning groove (342) which corresponds to the carved mark (31) shown as "6" on the upper surface of the outer shell (3). The positioning ball (433b) contacts with the inner wall (34) of the outer shell (3) between the positioning groove (342) corresponding to the carved mark indicating "8" and the positioning groove (342) corresponding to the carved mark indicating "10".

FIG. 14(b) shows the indicator (5) rotated to 30 degrees in a clockwise direction. In FIG. 14(b), the positioning ball (433a) contacts with the inner wall (34) of the outer shell (3) between the positioning groove (342) which corresponds to the carved mark (31) shown as "8" and the positioning groove (342) which corresponds to the carved mark (31) shown as "10".

FIG. 14(c) shows the indicator (5) further rotated to 30 degrees in a clockwise direction. In FIG. 14(c), the positioning ball (433a) engages with the positioning groove (342) which corresponds to the carved mark (31) shown as "8" on the upper surface of the outer shell (3). The positioning ball (433b) contacts with the inner wall (34) Of the outer shell (3) between the positioning groove (342) which corresponds to the carved mark (31) shown as "10" and the positioning groove (342) which corresponds to the carved mark (31) shown as "12".

Thus, the decrease in the number of the positioning grooves (342) on the inner wall of the outer shell (3) by half with widening the positioning groove (342) results in sufficiently deep engagement between the positioning groove (342) and the positioning ball (433).

FIG. 15 shows a cross-sectional view of another modified embodiment of the outer shell (3).

In the examples shown in FIGS. 2 to 14, the positioning groove (342) is formed on the outer shell (3). However, the positioning hole (343) radially penetrating the periphery wall of the outer shell (3) may be formed instead of the positioning groove (342). Like the above-described positioning groove (342), the positioning hole (343) is provided at a constant pitch along with the periphery wall of the outer shell (3), which corresponds to the carved mark (31) on the upper surface of the outer shell (3). When the upper surface of the rotatable tube (4) is leveled with that of the outer shell (3), an exposed portion of the positioning ball (433) enters into the inner edge of the positioning hole (343), thus the positioning to the rotatable tube (4) may be done.

FIG. 16 shows a cross-sectional view of another embodiment of the marking device (1).

The marking device (1) shown in FIG. 16 has the same structure as that of shown in FIG. 2, however, there is a difference in using a coil spring (76) instead of the nut (7) and the washer (6) for supporting the rotatable tube (4). There is also a difference in forming no neck (533) with threaded portion (531) of the indicator (5). Further, in the ring reception (453), a lid (81) for preventing a detachment of the ratchet ring (8) is engaged as well as the ratchet ring (8). It is also applicable to apply structure provided with the lid (81) as well as ratchet ring (8) to the marking device (1) shown in FIGS. 2 to 15.

The coil spring (76) is provided in the space formed between the bottom surface of the rotatable tube (4) and the upper surface of the bottom (32) of the outer shell (3). The lower edge of the coil spring (76) contacts with the upper surface of the bottom (32) of the outer shell (3), and the upper edge of the coil spring (76) contacts with the bottom surface of the rotatable tube (4). When the upper surface of the rotatable tube (4) is leveled with the outer shell (3), the coil spring (76) is compressed and pushes up the rotatable tube (4).

FIG. 17 shows an assembling process of the marking device (1) shown in FIG. 16.

First, the ratchet ring (8) and the lid (81) are engaged with the ring reception (453) of the bottom surface of the rotatable tube (4), and then the indicator (5) is inserted into the through hole (45) of the rotatable tube (4) to configure the internal structure (9) comprising the rotatable tube (4) and indicator (5). In the outer shell (3), the coil spring (76) is provided.

FIG. 17(a) shows a cross-sectional view that the internal structure (9) is inserted into the outer shell (3). In FIG. 17(a) the threaded portion (531) of the indicator (5) and the bottom (32) of the threaded hole (321) are not engaged.

In FIG. 17(a), the rotatable tube (4) is pushed up by the coil spring (76), and the upper surfaces of the rotatable tube (4) and the indicator (5) are leveled with each other. The periphery surface of the head (42) of the rotatable tube (4) is apart from the inner wall (33) which defines the frusto-conical space (331) of the outer shell (3). This results in no friction between the inner wall (33) of the frusto-conical space (331) and the peripheral surface of the head of the rotatable tube (4). Therefore, the torque for rotating the indicator (5) can be decreased.

FIG. 17(b) shows a cross-sectional view in which the upper surfaces of indicator (5), the rotatable tube (4), and the outer shell (3) are leveled each other.

When the threaded portion (531) of the indicator (5) is further engaged with the threaded hole (321) of the outer shell (3), the head (52) of the indicator (5) pushes the rotatable tube (4) to move downwardly. Therefore, no friction is caused between the outer surface of the head (42) of the rotatable tube (4) and the inner wall (33) defining frusto-conical space (331), so that the rotation of the indicator (5) requires very small torque until the upper surface of the rotatable tube (4) is leveled with that of the outer shell body (3).

When the ratchet ring (8) is fitted in the marking device (1) explained according to FIGS. 16 and 17, the surface shown in FIG. 6 is used as a bottom surface of the ratchet ring (8). While the indicator (5) is rotated in a clockwise direction to engage with the threaded hole (321) of the bottom (32) of the outer shell surface (3), it is preferable to engage the control ball (536) attached to with a first edge (821) of the ratchet ring (8). Therefore, the indicator (5) and the rotatable tube (4) are integrally rotated to prevent the relative rotational movement between the indicator (5) and the rotatable tube (4). This results in the preferable connection between the indicator (5) and the outer shell (3).

FIG. 18 shows a further simplified embodiment of the structure of the marking device (1) explained according to FIGS. 16 and 17. FIG. 18(a) is a plain view of the marking device (1), and FIG. 18(b) is a cross-sectional view of the marking device (1).

The marking device (1) shown in FIG. 18 is different from the one shown in FIGS. 16 and 17 in including no ratchet ring (8), lid (81), and the ring reception (453) for receiving the ratchet ring (8) and the lid (81). The coil spring (76) fixedly surrounds the leg (44) of the rotatable tube (4). The structure of the coil spring (76) fixedly surrounding the leg (44) of the rotatable tube (4) may also be applied to the marking device (1) shown in the FIGS. 16 and 17.

The linear carving mark (51) formed on the upper surface of the indicator (5) extends along with the diameter thereof. On the upper surface of the rotatable tube (4) of the marking device (1) explained according to the FIGS. 2 to 17, the triangle carved mark (41) is carved, however, a narrow-shaped carved mark (41) is carved instead on the marking device (1) shown in FIG. 18. The shaft part of the arrow extends to the inner edge of the rotatable tube (4), which is formed in communication with the carved mark (51) of the indicator (5).

In the marking device (1) shown in FIG. 18, when rotating the indicator (5) alone, a tool having a linear tip shorter than the diameter of the indicator (5) should be prepared, and the tip of the tool is inserted into the carved mark of the indicator (5). When the indicator (5) and the rotatable tube (4) are rotated together, the indicator (5) is rotated first, and then the carved mark (51) of the indicator (5) is communicated with the arrow-shaped carved mark (41). In this way, the tip of the tool is inserted into the carved marks (51, 41) crossing the border between the indicator (5) and the rotatable tube (4), and the indicator (5) and the rotatable tube (4) are rotated together.

What is claimed is:

1. A marking device comprising;
   an outer shell comprising a first surface with at least one relief character and a bottom surface, the first surface defining an opening,
   a rotatable tube comprising a tapered head comprising a second surface with at least one relief character, the rotatable tube inserted into the outer shell through its opening so that the second surface is leveled with the first surface while the tapered head sealingly contacts with an inner wall of the outer shell,
   an indicator comprising a tapered head with a third surface with at least one relief character and a threaded leg engaged with a threaded hole provided in the bottom surface of the outer shell, the taper head including a periphery surface configured to sealingly contact with an inner surface of the rotatable tube when the third surface is leveled with the second surface,
   a support mechanism configured to support the rotatable tube in the outer shell,
   a ratchet ring located at a bottom of the rotatable tube, and
   a control ball protruding from a periphery surface of the indicator, the control ball configured to engage with the ratchet ring when the indicator rotates in a first direction so that the rotatable tube rotates with the indicator and to retract into a receiving hole of the indicator when the indicator rotates in a second direction so that the rotatable tube remains stationary, wherein the support mechanism makes a periphery surface of the head of the rotatable tube apart from the inner surface of the outer shell until the third surface is leveled with the first surface.

2. The marking device according to claim 1, wherein the support mechanism includes a member radially protruding from the indicator leg, the member supportingly contacts with the bottom of the rotatable tube until the third surface is leveled with the first surface.

3. The marking device according to claim 2, wherein the leg includes a proximal end from which a threaded portion starts, and the member is a nut at the proximal end.

4. The marking device according to claim 1, wherein the engagement between the threaded leg of the indicator and the threaded hole of the outer shell is loosened when the indicator rotates in the first direction.

5. The marking device according to claim 1, wherein the rotatable tube further includes a trunk extending from the head of the rotatable tube, the trunk including at least one positioning ball protruding from the periphery surface of the trunk so as to engage with at least one positioning groove disposed on the inner surface of the outer wall, the at least one positioning groove corresponding to the at least one relief on the first surface.

6. The marking device according to claim 1, wherein the rotatable tube has a greater coefficient of thermal expansion than the outer shell.

7. The marking device according to claim 1, wherein the indicator has a greater coefficient of thermal expansion than the rotatable tube.

8. The marking device according to claim 1, wherein the inner surface of the outer shell includes at least one annular groove surrounding the head of the rotatable tube.

9. The marking device according to claim 1, wherein the head of the rotatable tube includes at least one annular groove on its periphery surface.

10. The marking device according to claim 1, wherein the inner surface of the rotatable tube includes at least one annular groove surrounding the head of the indicator.

11. The marking device according to claim 1, wherein the head of the indicator includes at least one annular groove on its periphery surface.

12. The marking device according to claim 1, wherein the support mechanism includes a coil spring between the rotatable tube and the bottom of the outer shell, and wherein
the engagement between the leg and the threaded hole is loosened when the indicator rotates in the second direction.

13. The marking device according to claim 5, wherein said at least one positioning ball is two positioning balls;
wherein one of the positioning balls is retracted into the trunk of the rotatable tube while the other engages with the positioning groove.

* * * * *